(12) United States Patent
Flick

(10) Patent No.: US 10,733,146 B2
(45) Date of Patent: Aug. 4, 2020

(54) INLINE KEYED METADATA

(71) Applicant: Apple Inc., Cupertino, CA (US)

(72) Inventor: Christopher L. Flick, San Jose, CA (US)

(73) Assignee: Apple Inc., Cupertino, CA (US)

( * ) Notice: Subject to any disclaimer, the term of this patent is extended or adjusted under 35 U.S.C. 154(b) by 953 days.

(21) Appl. No.: 14/603,007

(22) Filed: Jan. 22, 2015

(65) Prior Publication Data

US 2016/0092461 A1  Mar. 31, 2016

Related U.S. Application Data

(60) Provisional application No. 62/057,966, filed on Sep. 30, 2014.

(51) Int. Cl.
*G06F 16/16* (2019.01)
*G06F 16/583* (2019.01)

(52) U.S. Cl.
CPC .......... *G06F 16/164* (2019.01); *G06F 16/583* (2019.01)

(58) Field of Classification Search
CPC ............. G06F 17/3002; G06F 17/3012; G06F 17/30035; G06F 17/30817; G06F 17/30749; G06F 16/164; G06F 16/583; G06F 16/908; G06F 16/48; G11B 27/00; G11B 27/322
See application file for complete search history.

(56) References Cited

U.S. PATENT DOCUMENTS

| | | | |
|---|---|---|---|
| 7,555,009 B2 | 6/2009 | Oshima | |
| 8,620,967 B2 | 12/2013 | Wessling | |
| 8,655,854 B2 | 2/2014 | Claman et al. | |
| 2001/0052073 A1* | 12/2001 | Kern | G06F 21/10 713/161 |
| 2004/0156613 A1 | 8/2004 | Hempel et al. | |
| 2005/0114671 A1* | 5/2005 | Little | H04L 51/063 713/182 |
| 2006/0122989 A1* | 6/2006 | Kurupati | G06F 16/289 |
| 2010/0094897 A1 | 4/2010 | Sumrall et al. | |
| 2010/0153395 A1 | 6/2010 | Hannuksela et al. | |
| 2010/0262711 A1 | 10/2010 | Bouazizi | |
| 2011/0064146 A1* | 3/2011 | Chen | H04N 21/234327 375/240.26 |
| 2012/0030182 A1 | 2/2012 | Claman et al. | |
| 2012/0102042 A1 | 4/2012 | Flick et al. | |
| 2012/0102078 A1* | 4/2012 | Flick | G06F 16/68 707/825 |
| 2012/0185607 A1 | 7/2012 | Rhyu et al. | |
| 2014/0143212 A1* | 5/2014 | Shumay | G06F 17/30035 707/692 |

\* cited by examiner

*Primary Examiner* — James Trujillo
*Assistant Examiner* — Fatima P Mina
(74) *Attorney, Agent, or Firm* — BakerHostetler

(57) ABSTRACT

An encoding system may include a metadata manager, a key manager, and an encoder. The metadata manager may interface with one or more metadata sources to determine whether to include a metadata item from the one or more metadata sources. The key manager may determine whether the metadata item can be represented using one of already-allocated keys or an inline key must be used to represent the metadata item. The encoder may encode the metadata. If an inline key must be used to represent the metadata item, the encoder may associate the inline key and the type of the metadata item to the media file, and the encoder may encode the metadata item using the inline key in the media file.

28 Claims, 4 Drawing Sheets

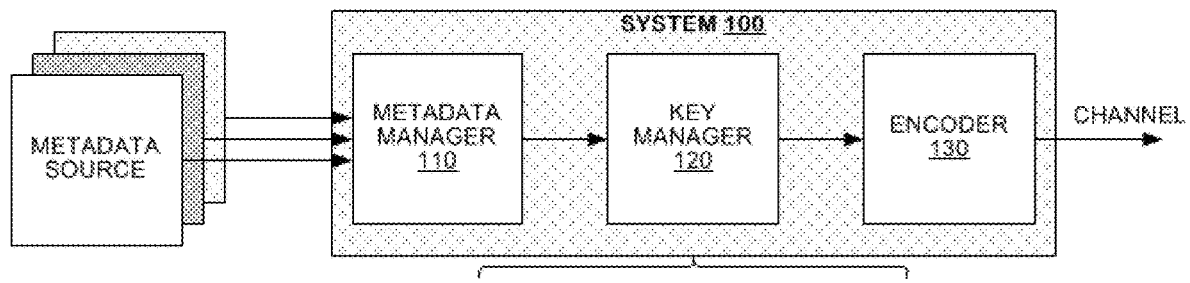
FIG. 1
100
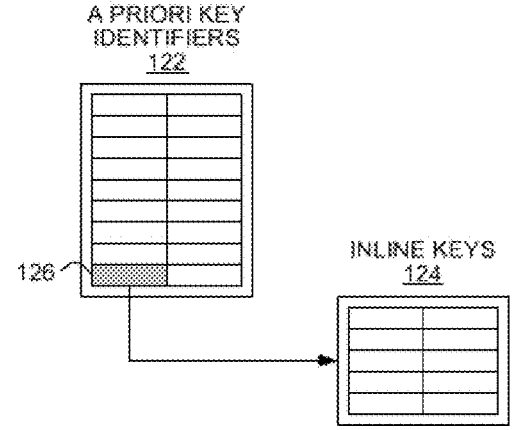
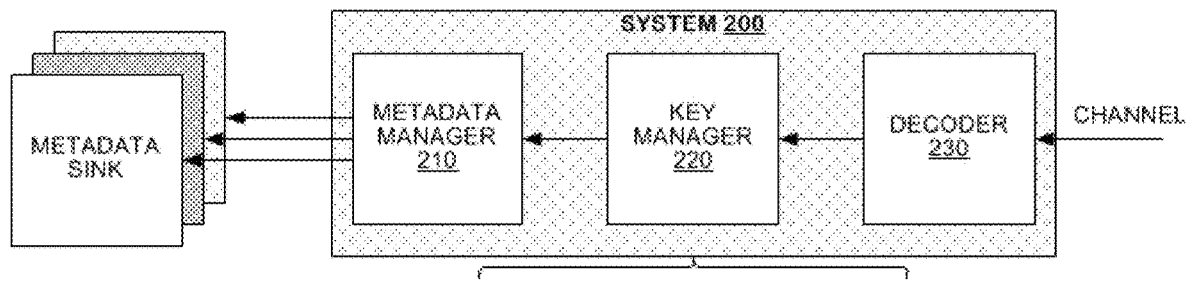
FIG. 2
200
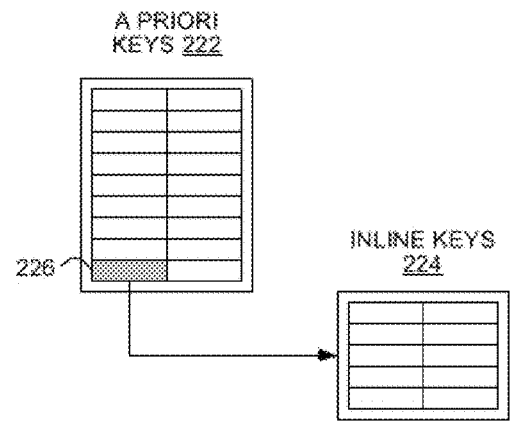

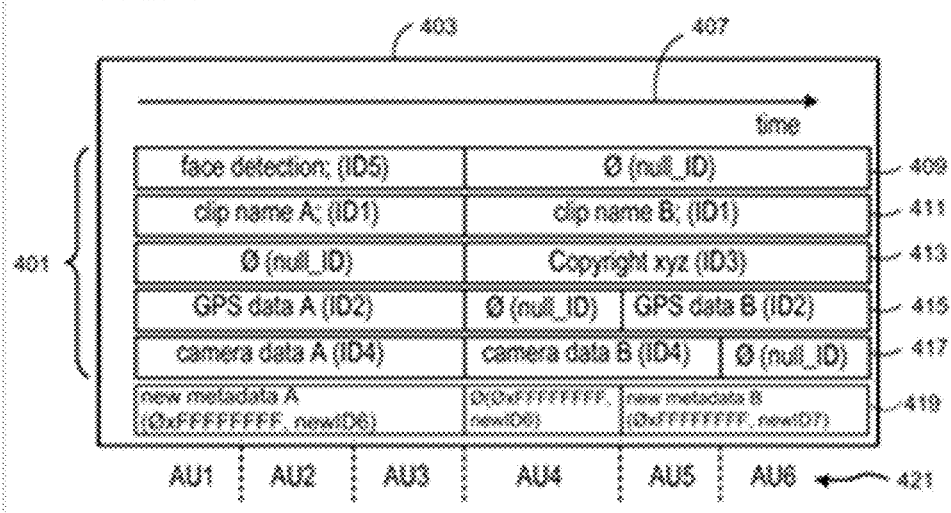

500

600

INLINE KEYED METADATA

CROSS-REFERENCE TO RELATED CASES

The present application claims priority to U.S. Provisional Application No. 62/057,966, filed Sep. 30, 2014, and incorporates herein the disclosure of that application.

BACKGROUND

The present invention relates generally to methods and systems for coding metadata in multimedia files.

Many electronic devices have the ability to record media such as still images, video, audio, or a combination thereof, to storage devices. To assist operators in managing the stored media, the electronic device may mark media files with different types of information, such as metadata. For example, the electronic device may provide a date and time indicating when the video was recorded. Other metadata may include data representing shutter speed, F/stop, GPS coordinates, text/caption data for one or more languages, among others. The metadata may be stored in a "metadata track," a serial information stream in the media file that is distinct from but multiplexed in the file with other serial information streams, including audio and/or video data.

The types and content of the metadata may vary from file to file. Generally, the different types of metadata are declared in a header of the metadata track by metadata declarations. The coding protocols do not provide for declarations of metadata outside of the metadata header. Thus, if new types of metadata became available for a media file after creation of the media file had started, it could not be added to the media file without aborting creation of the file and restarting it. If multiple types of metadata were encountered in a single media item, creation of the media file would have to recur each time a new metadata type is encountered, and this would significantly increase the processing time and the recording time of the media data. And, while it may be possible to declare all possible metadata types in metadata header, doing so would add significant overhead to the metadata track thereby increasing its size, and it would be inefficient because it likely would declare metadata types that may not be used in the media file.

Thus, there may be a need for an improved way of organizing metadata in media files that may flexibly handle new metadata types on-the-fly without adding significant overhead size to the metadata track and without adding significant processing and recording time.

BRIEF DESCRIPTION OF THE DRAWINGS

FIG. 1 illustrates an exemplary encoding system according to an embodiment.

FIG. 2 illustrates an exemplary decoding system according to an embodiment.

FIG. 3 illustrates an exemplary metadata description according to an embodiment.

FIG. 4 illustrates an exemplary metadata track according to an embodiment.

DETAILED DESCRIPTION

Figure 5:
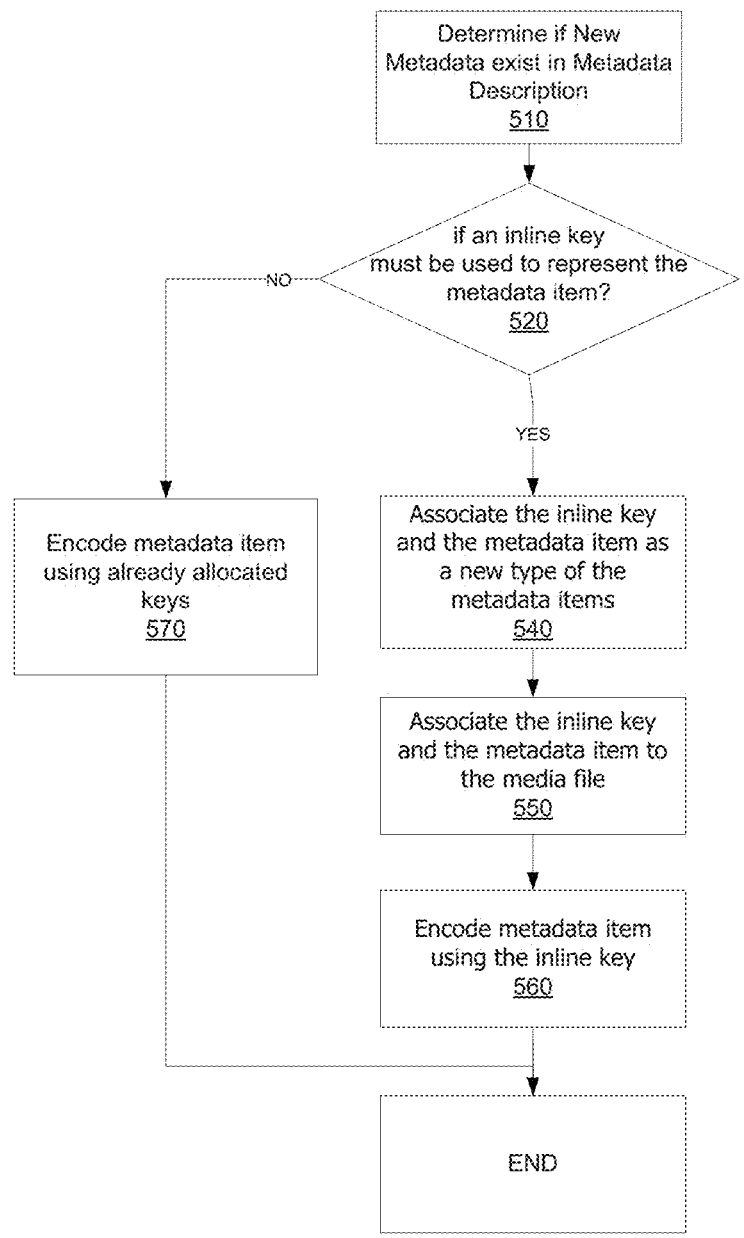
FIG. 5 illustrates an exemplary encoding process according to an embodiment.

Embodiments of the present invention provide a metadata declaration protocol that permits new items of metadata to be included in a media track on an inline basis. First, a reservation identifier is defined in a metadata header using a predetermined pattern. Thereafter, when a new metadata item is encountered, a metadata encoder may identify it in a metadata track by writing the reservation identifier to the track along with a key identifier and a definition of the new metadata item. The key identifier may provide an index number of the new metadata item. Each new metadata item may be identified in the media file using the reservation identifier, a respective key identifier and a respective definition of the new metadata item.

FIG. 1 illustrates an exemplary coding system 100 according to an embodiment of the present invention. The system 100 may include a metadata manager 110, a key manager 120 and an encoder 130. The metadata manager 110 may interface with a variety of metadata sources that may be available to the system 100 during a coding session. The metadata manager 110 may determine whether to include a metadata item from one of the metadata sources as part of the coded session data. When the metadata manager 110 decides to include a metadata item in the coded session data, the key manager 120 may determine whether the metadata item can be represented using an already-allocated key or whether an inline key must be used. The encoder 130 may code the metadata item in the coded session data. When new metadata items are added to a session, the encoder 130 may include signaling in the coded session data to identify the new metadata item via an inline key.

The key manager 120 may operate according to a pair of data structures 122, 124 as shown in FIG. 1. A first data structure 122 may include a table representing all keys defined at the onset of a new coding session. The first data structure 122 may include an entry representing a reservation identifier 126, which links to the second data structure 124. The reservation identifier may be assigned a metadata key pattern that is distinct from other metadata items coded at the onset of the coding session. The second data structure 124 may represent metadata items that are defined after the onset of a coding session. Thus, when a new metadata item is to be represented during the coding session, it may be signaling using an inline key protocol and added to the inline key table 124.

The system 100 may operate with a host of metadata sources, including sources that may be available to the system 100 only intermittently. Exemplary metadata sources include image capture systems (image sensors and supporting structures), audio capture systems, geo-location systems, content detection systems (e.g., object- and/or face-detection systems), production systems that provide textual descriptors for media, digital rights management systems, biometrics systems, and the like. The metadata manager 110 may be represented by a processing system that determines which types of metadata to include in the coding session data and which types of metadata not to include. The metadata manager 110 also may include processing that may predict which types of metadata are likely to be included in coding session data even if metadata sources that are associated with those types are not available to the system 100 at the onset of the session.

Consider operation of the system 100. When a coding session is to begin, the metadata manager 110 may identify to the key manager 120 items of metadata that are likely to be included in coding session data. The key manager 120 may build a table 122 of a priori key identifiers that assigns a key value to each type of metadata identified by the metadata manager 110. The key values simply may be codes that distinguish the different types of metadata from each other. The key manager 120 also may include an additional entry for support of in-line keys and assign a key value to that entry (called, a "reservation identifier" herein). The key manager 120 also may interface with the encoder 130 to include signaling in the coded session data that identifies the types of media items in the a priori key table and the key values that are assigned to them, including the reservation identifier. The inline key table 124 initially may be empty.

While the session is ongoing, the metadata manager 110 may select various elements of metadata for inclusion in the coded session data. The metadata manager 110 may identify the metadata item to the key manager 120 along with its values. In response, the key manager 120 may search the a priori key table 122 and the inline key table 124 to determine if the type of metadata provided by the metadata manager 110 matches a type that already has been logged to one of the tables. If so, the key manager 120 may provide information to the encoder 130 to identify the key table entry in the coded session data along with the new metadata values provided by the metadata manager 110. If not, the key manager 120 may add the new metadata item to the inline key table 124 and cause the encoder 130 to identify the new metadata item by the inline key signaling protocol.

When a new metadata item is added to the inline key table 124, the metadata item may be assigned a key value from the table 124. The encoder 130 may represent the new metadata item by identifying the reservation identifier from the a priori key table 122, the metadata item's assigned key value from the inline key table 124 and the values to be assigned to the metadata key item.

The encoder 130 may output coded metadata to a coded session data stream. Often, multi-media data is composed of a plurality of independent tracks, for example, a coded video track, a coded audio track and one or more coded metadata tracks. The tracks may be multiplexed together to form a coded session data stream. The encoder's output may be provided in a coded metadata track which may be multiplexed with other data streams to form the coded session data streams.

FIG. 2 illustrates an exemplary decoding system 200 according to an embodiment of the present invention. The decoding system 200 may include a metadata manager 210, a key manager 220, and a decoder 230. The decoder 230 may parse data from a received metadata track to identify data elements represented therein. For example the decoder 230 may identify key values from the metadata track and forward them to the key manager 220. The key manager 220 may manage keys that are identified in the coded session data. It may build a table of a priori keys 222 based on data provided in the coded session data at the onset of a session, including an entry for the reservation identifier. It also may build a table of inline keys 224 dynamically as determined from the received session data. The metadata manager 210 may perform operations to output received metadata items as needed within the decoding system 200. For example, the metadata manager 210 may output data to one or more metadata sinks as dictated by system demands.

During operation, at the onset of a decoding session, the key manager 220 may receive identifications of key values that are contained in the channel data and metadata items to which they related. The key manager may build a table 222 of a priori key identifiers. Again, the key values may be the codes that were assigned by an encoder to distinguish the different types of metadata from each other. The key manager 220 also may include an additional entry for support of in-line keys and assign a key value to that entry 226 (called, a "reservation identifier" herein). If any preliminary data is received that provides values of the metadata items, they may be stored in the a priori key table 222, also. The inline key table 224 initially may be empty.

While the session is ongoing, the decoder 230 may receive various items of metadata in the metadata track, which are identified by key value. The key manager 220 may search its a priori key table 222 to determine whether a received key value matches a values stored in the table. If so (and unless the key value matches the reservation identifier 226), the metadata item was defined at the onset of the coding session. In this case, the key manager 220 may record new values for the metadata item. If the key value matches the reservation identifier, the key value signals use of an inline key.

When an inline key is signaled, the decoding system 200 compares a secondary key received by the received data unit to contents of the inline key table 224. If the secondary key matches an entry of the inline key table 224, then the data item refers to a key entry that was defined earlier in the session. The system 200 may record new metadata values from the received data item. If the secondary key does not match an entry of the inline key table 224, then the data item refers to a new inline key. The new inline key may be added to the inline key table 224. In this fashion, the inline keyed identifiers may be undeclared ahead of time, and subsequently defined "inline", i.e. while the new metadata type is captured and the metadata track is being stored.

FIGS. 3 and 4 illustrate an exemplary scenario of metadata items (FIG. 4) and their representation in an a priori key table 301 (FIG. 3). In FIG. 3, entries 302-311 illustrate exemplary data that may be available for five types of metadata. They are shown as having been assigned key values ID1-ID5, respectively. In FIG. 3, entry 313 represents an exemplary reservation identifier, which has been assigned a key value of 0xFFFFFFFF. It likely will be convenient for system operators to assign a key value to a reservation identifier that is unlikely to arise otherwise in operation.

FIG. 4 illustrates content that may be associated with an exemplary metadata track 401. Source media data (e.g., coded audio-visual data) may be parsed into a plurality of access units 421, shown as AU1-AU6. Metadata items 409-419 associated with the source media data may change from access unit to access unit. Some metadata items may take null values. A metadata track 401 may associate these changing metadata items with the access units.

As shown in the example of FIG. 3, metadata items ID1-ID5 were identified at the onset of a coding session and were known to the encoder 100 at the outset. These metadata items, therefore, may have designated entries in the a priori key tables 122 (FIG. 1) and 222 (FIG. 2). Metadata items A and B 419, however, may not have been known. They may be added to the coding session through the use of inline keys.

The a priori key table 301 also may include a null identifier "null ID" 302 which will match and be identical to the null ID contained within the time based metadata tracks, such as the null ID contained within metadata track 409 or metadata track 413 or metadata track 415. In the example of FIG. 3, metadata information 303 may provide information for the clip name metadata type and may include the identifier or key for that type of metadata (ID1) as well as a key name space information for that identifier and a data type information specifying how to interpret the clip name (e.g. the clip name may be provided in ASCII format, etc.). Metadata information 305 may include the identifier or key for GPS-type metadata as well as information with respect to the key name space for that identifier and data type information indicating how to interpret the GPS data coordinates (e.g. as latitude and longitude or other types of position information). Further, metadata information 305 may include other types of metadata information relating to that type of metadata. Metadata information 307 may include the identifier (ID3) for copyright metadata and may include a key name space information describing a structure of that identifier for the copyright metadata and may also include data type information indicating how to interpret the metadata of this type. Metadata information 309 may include the identifier (ID4) for camera data metadata and may include a key name space describing a data structure for the identifier ID4 and may also include data type information specifying how to interpret metadata of the camera data type such as whether the film speed may be in ASA or ISO, etc. Metadata information 311 may include the identifier (ID5) for face detection metadata and information about the key name space for that identifier ID5 and data type information specifying how to interpret the face detection metadata and potentially other types of information with respect to this type of metadata.

Metadata information 313 thus may allow encoding of new types of metadata inline without declaring the additional metadata types in the metadata description 301. In this fashion, the inline keyed identifiers may be undeclared ahead of time, and subsequently defined "inline", i.e. while the new metadata type is captured and the metadata track is being stored.

While the examples shown in FIGS. 3 and 4 may include five different types of metadata and an inline keyed metadata type, these are merely exemplary. A variety of different types of metadata may be included such as any one of the types shown in FIG. 4 and other types of metadata such as spatial orientation information (e.g. obtained from accelerometers), picture quality metadata, user added metadata, other types of position information metadata such as position information derived from a cellular telephone communication system or other types of satellite positioning systems other than the GPS system or location information derived from data networks, such as WiFi hotspot location information or other information derived from a data network. It will also be understood that the sample description 301 may include other types of information with respect to the metadata tracks, and that the metadata tracks may also include information about the metadata track such as the height and width (both being zero in a typical implementation) and a track volume (of zero) for the metadata track. Further, the metadata track may be associated with a time based media track (e.g. video and/or audio tracks) by a reference that the time based metadata track describes the time based media track.

FIG. 5 illustrates an exemplary encoding method 500 according to an embodiment.

According to an embodiment, the method 500 may include, at block 510, a determination whether a metadata item can be represented using one of already-allocated keys (in the first data structure 122) or an inline key (in the second data structure 124) must be used to represent the metadata item (block 520).

If an inline key must be used to represent the metadata item, the method 500 may associate the inline key and corresponding one of the metadata items as a new type of the metadata items (block 540). The method 500 may associate the inline key and the corresponding one of the metadata items to the metadata item (block 550). Thereafter, the method 500 may encode the metadata item using the reservation identifier and a key value representing the inline (block 560). If the inline key is newly allocated, it may be added to the inline key table.

If the metadata item can be represented using one of already-allocated keys, the method 500 may encode the metadata item in the metadata track using one of already-allocated keys, for example, those listed in the first data structure 122 (block 570).

Figure 6:
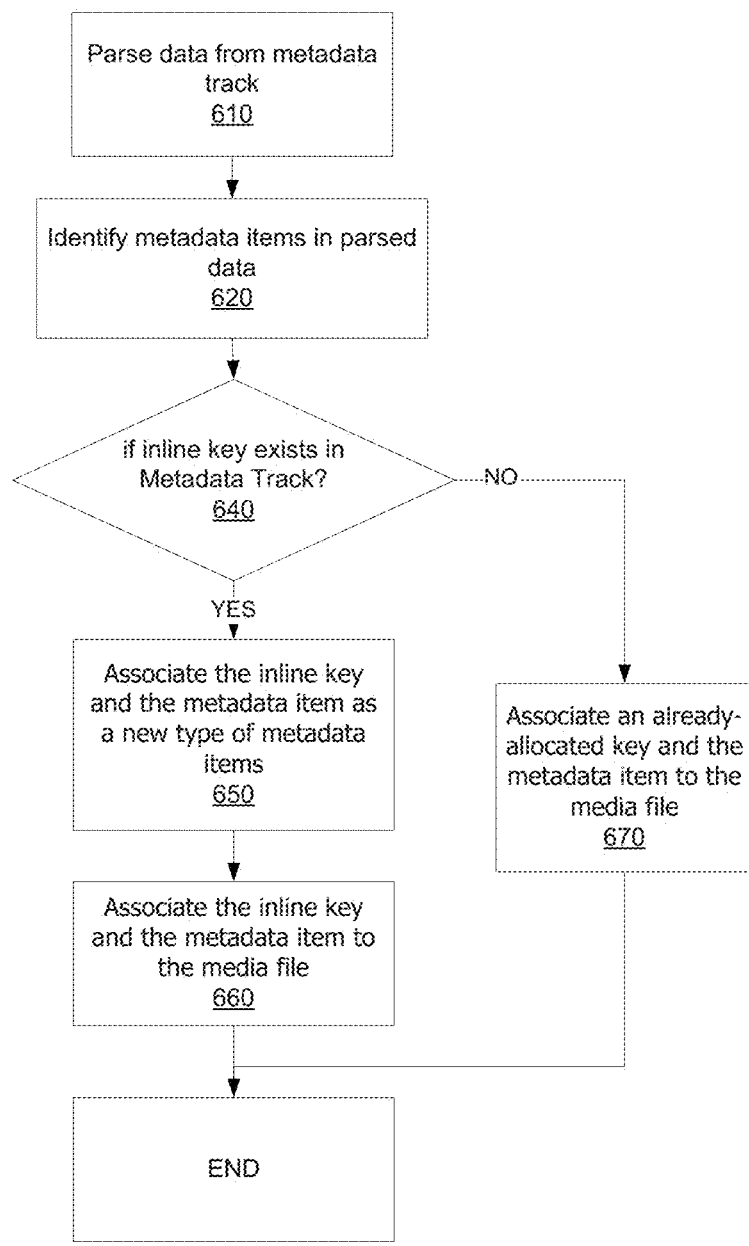
FIG. 6 illustrates an exemplary decoding process according to an embodiment.

FIG. 6 illustrates an exemplary decoding method 600 according to an embodiment. The method 600 may include, at block 610, parsing data from a received metadata track in a media file. At block 620, the method 600 may identify metadata items in the parsed data (block 640). If the method 600 identifies an inline key in the received metadata track, the key manager 220 may determine whether the inline key is new and record a new type of metadata item in the inline key table (block 650). Thereafter, the method 600 may record the inline key and the values of the metadata item (block 660).

If the method 600 identifies an already-allocated key in the received metadata track, either as a key defined at the onset of the session or through a previously received inline key, the method 600 may record values of the metadata item associated with the received key (block 670).

In certain embodiments, a time based metadata track may be described by a non-time based description that may be referred to as a sample description. The time based metadata track may be a concatenated series of metadata contained within samples, or other distinct, retrievable objects, and each of these objects or samples may be associated with a playback time, such as a time stamp for a particular playback time, such that the metadata may be presented or retrieved along with audio or video when the audio or video (or both) may be presented (e.g. displayed) even without presenting the media track. In other words, the time based metadata track has content, such as data for one or more types of metadata, that may be synchronized in time with media content that may be dependent upon time such as audio or video or both audio and video. In the case of the ISO (International Organization for Standardization) Standard ISO/IEC 14496-12:2008: The ISO Base Media File Format, a track may be a time sequence of related samples in an ISO base media file; for a media track implemented according to this international standard, a sample may be an individual frame of video, a series of video frames in a decoding order or a compressed section of audio in decoding order, and a sample may be all data associated with a single time stamp. In one implementation of this international standard, no two samples within a track may share the same time stamp and the time stamps may progress in time from a starting time to an ending time. The sample description, on the other hand, may be not time based although it may include references to time for those embodiments in which the sample description provides an index to the location of metadata within the time based metadata track. The sample description provides a way to search or examine the time based metadata track without having to scan through or search the metadata track. This may be useful because the metadata may sometimes be missing in the metadata track.

For example, runs of metadata within a time based metadata track may be interspersed with runs of no metadata. For example, GPS data may not be available when a recording system, such as a video camera which includes a GPS receiver, may be used within a building, but the GPS signals and hence GPS data will generally be available when the recording device may be used outside of the building. If a video may be recorded both indoors and outdoors and the GPS receiver operates during the entire recording session, GPS data may be available while the device may be outside of the building but often will not be available when the recording device may be within the building. Hence, a metadata track containing GPS data may have time periods in the metadata track which include GPS data and other time periods where there may be no GPS metadata in the metadata track, and thus this metadata track includes GPS metadata interspersed with no GPS metadata associated with the movie that was recorded. In some cases, the movie could be recorded and there may be no GPS metadata because the entire movie was recorded within a building which prevented the GPS receiver from receiving GPS signals.

The various embodiments of the invention may provide a set of files (e.g. one or more files) or a file format that includes the time based media track(s) and a time based metadata track(s) and also includes the non-time based sample description. The set of files may be stored on a machine readable non-transitory storage medium, such as a flash memory or other semiconductor memory, magnetic memory, optical memory, etc. Other embodiments may include methods of creating the files, methods of transmitting or otherwise distributing the set of files, methods of using the set of files, such as playback or examination of the sample description that describes the metadata track, and methods of revising a sample description to correct for the absence of metadata that was expected or declared in the sample description. These methods may be performed by one or more data processing systems and may be performed by executing instructions from a machine readable non-transitory storage medium.

The following exemplary protocol and syntax may be used to implement the inline keyed metadata encoding according to an embodiment of the present disclosure.

Sample Entry for Boxed AUs

The sample entry for boxed AUs may be the BoxedMetaDataSampleEntry:

```
aligned(8) class BoxedMetaDataSampleEntry extends
  MetaDataSampleEntry ('mebx') {
  MetaDataKeyTableBox( );
  MetadataInlineKeysPresentBox ( ); // optional
  BitRateBox ( ); // optional
}
```

Semantics

MetaDataKeyTableBox (defined below) may be a table indicating the set of keys and information about each key that may occur in associated access units.

MetadataInlineKeysPresentBox (defined below) may be an optional box to signal if inline key/value boxes may occur in associated access units.

BitRateBox may be an optional box to signal the bitrate of the metadata stream.

In one embodiment, BoxedMetaDataSampleEntry( ) may include MetaDataKeyTableBox( ) which defines what metadata values may be found in the AUs of the track.

MetaDataKeyTableBox

The MetaDataKeyTableBox contains a table of keys and mappings to payload data in the corresponding access units. It may be defined as:

```
aligned(8) class MetaDataKeyTableBox extends Box('keys') {
  MetaDataKeyBox[ ];
};
```

This may be a box containing one or more instances of MetaDataKeyBox, one for each "configuration" of key that may occur in the access units of the track. For example, if there may be two keys, there will be two MetadataKeyBox boxes in the MetadataKeyTableBox—one for each key.

If the MetadataKeyTableBox does not contain a key for which a client may be searching and there may be no MetadataInlineKeysPresentBox or no MetadataInlineKeysPresentBox signaling the possible presence of inline keys, no access units associated with this sample entry contain values with that key.

If the MetadataKeyTableBox does contain a particular key, this does not however guarantee that any access units containing a value for the key were written. Clients finding a key in the MetadataKeyTableBox may still look through the track's access units for values to determine if the track has the particular metadata. If the optimization described in "Using Sample Groups to Optimize Key Searches" may be used, the reader may determine which, if any, access units contain values for the key.

This may allow a sample entry to be populated (say during a capture process) with keys that might be discovered and then access units to be written with a binding only for the keys found. This makes writing using movie fragments easier as the sample entries in the initial movie may be populated without rewriting. It may be possible to remove unused sample entries efficiently and rewrite the sample entry.

MetaDataKeyBox

MetaDataKeyBox may be defined as:

```
aligned(8) class MetaDataKeyBox extends
  Box(local_key_id) {
  MetaDataKeyDeclarationBox( );
  MetaDataDatatypeBox( );      // optional
  MetaDataLocaleBox( );        // optional
  MetaDataSetupBox( );         // optional
  MetaDataExtensionsBox( );    // optional
};
```

The box type for each MetaDataKeyBox may be here referred to as 'local_key_id' and serves (1) as a unique identifier among all MetaDataKeyBoxes and (2) as the identifier for the metadata value boxes within access units that have that key.

The box type for the contained MetaDataKeyBox may be 'local' to the containing track and corresponds to the box types (32-bit integers or fourCCs) for boxes within metadata access units that hold that particular metadata value. For example, if the MetadataKeyBox has the box type of 'stuf', any boxes of type 'stuf' in access units sharing this sample entry hold the value for this key. Any value other than 0 and the reservation identifier (for example, 0xFFFFFFFF) fitting in a 32-bit big endian integer may be used (e.g., 'stuf', the integer 72) but it may be recommended that it be mnemonic if possible. See Sample Data Format below.

There may be two reserved box types for boxes of type MetadataKeyBox. A local_key_id of 0 indicates that the MetadataKeyBox may be unused and may not be interpreted. This may allow the key to be marked as unused in the sample entry without requiring the sample entry and parent atoms to be rewritten/resized. A local_key_id that matches the reservation identifier (for example, 0xFFFFFFFF) may not occur in MetadataKeyTableBox as this special value may be used to signal inline key/value boxes within access units.

Other box types may be available for use.

In some applications, the children boxes within MetadataKeyTableBox may take on any box type, and there may be no special interpretation of the box type for contained boxes other than the special value 0. Therefore, including a 'free' box does not have the conventional meaning in the MetadataKeyBox. Even so, it may be beneficial to avoid overly confusing use of existing fourCCs.

Each MetadataKeyBox contains a variable number of boxes that define the key structure, the datatype for values, optionally the locale for the values, and optional setup information for interpreting the value.

MetaDataKeyDeclarationBox

The MetadataKeyDeclarationBox holds the key namespace and key value of that namespace for the given values:

```
aligned(8) class MetadataKeyDeclarationBox extends Box('keyd') {
    unsigned int(32) key_namespace;
    unsigned int(8) key_value[ ];
};
```

Semantics key_namespace may be a 32-bit identifier describing the domain and the structure of the key_value. For example, this could indicate that key_value may be a reverse-address style string (e.g., "com.foo.mymetadata"), a binary four-character codes (e.g., 'cprt' user data key), a Uniform Resource Identifier, or other structures (e.g., native formats from metadata standards such as MXF). New key_namespaces may be registered but as a reverse-address style string may often be used, using the reverse-address key_namespace may be sufficient for most uses.

key_value may be an array of bytes holding the key and whose interpretation may be defined by the associated key_namespace field.

The key_namespaces and key_values used in the metadata track format may be the same as those that may be used with the QuickTime enhanced metadata format. If a new key_namespace may be to be defined, it may be registered. If only a key is involved, the 'mdta' key_namespace may be used since it already allows for reverse-address (DNSbased) keys to be defined without risk of collision.

Examples of a few possible key_namespaces (or "key-spaces") could be:

'mime' A MIME type such as "image/jpeg"
'uri' A Uniform Resource Identifier such as "urn:example:path:to:piece"
'iudf' ISO compatible user data four-character code key such as "cprt"
'udta' QuickTime UserData four-character code key such as "©cpy"
'mdta' 'Reverse DNS' key format used in QuickTime metadata MetaDataDatatypeDefinitionBox To specify the data type of the value, it may be possible to include a MetadataDatatypeDefinitionBox as defined here:

```
aligned(8) class MetadataDatatypeDefinitionBox extends Box('dtyp') {
    unsigned int(32) datatype_namespace;
    unsigned int(8) datatype[ ];
};
```

Semantics datatype_namespace may be a 32-bit identifier describing how to interpret the data type for the value. It may be registered with the appropriate registration authority.

datatype may be an array of bytes holding the data type designation for values in Aus having this key.

MetaDataLocaleBox

A metadata value may optionally be tagged with its locale so that it may be chosen based upon the user's language, country, etc. This makes it possible to include several keys of the same key type (e.g., copyright or scene description) but with differing locales for users of different languages or locations.

This may be accomplished by including a MetaDataLocaleBox within the MetadataKeyBox. The definition of MetaDataLocaleBox is:

```
aligned(8) class MetaDataLocaleBox extends Box('loca') {
    string locale_string;
};
```

Semantics locale string may be a null-terminated string of UTF-8 characters (i.e., a "C string") holding a language tag complying with RFC 4646 (also known as BCP 47). Examples include 'en_US', 'fr_FR', or 'zh_CN'.

If the MetaDataLocaleBox may be absent, corresponding metadata values may be considered appropriate for all locales.

MetaDataSetupBox

Some metadata values benefit from having setup information to describe their interpretation. This setup data may be private to the metadata datatype. The data may take the form of leaf data bytes or children boxes.

```
aligned(8) class MetaDataSetupBox extends Box('setu') {// 'init' instead?
}
```

An example might be information used to interpret the coordinate system of rectangles used in face detection metadata. As mentioned, the contents of MetaDataSetupBox may be boxes or raw data, the structure being dependent upon the data type. Another kind of setup might be a media type (e.g., 'vide') and a sample description. This would allow the metadata to reference a still image compliant with H.264 because the setup for the 'awl' decoder may be available.

MetaDataExtensionsBox

Some metadata values may benefit from having publicly defined and interpretable state associated with them. This may be in contrast to the type-specific private state held in MetaDataSetupBox( ). By analogy, VisualSampleEntries may have PixelAspectRatioBox ('pasp') or CleanApertureBox ('clapC') extensions.

```
aligned(8) class MetaDataExtensionsBox extends Box('exte') {
    Box extensions[ ];
};
```

Semantics

MetaDataExtensionsBox contains one or more Boxes. The particular boxes may be data type or key type specific or may be more general.

MetadataInlineKeysPresentBox

Metadata item keys may be typically carried in the MetadataKeyTableBox. However, to support the recording of keys that may not be known when the sample entry may be built and so could not be included in the MetadataKeyTableBox, there may be support for metadata data items in access units that also carry their MetadataKeyBox with the value. This combination may be called an "inline key/value box" here.

The optional MetadataInlineKeysPresentBox indicates if inline key/value boxes might occur in corresponding access units. If MetadataInlineKeysPresentBox may be absent, no inline key/value boxes (value boxes with a local_id that matches the reservation identifier) may occur in the access units.

The box may be defined as:

```
aligned(8) class MetadataInlineKeysPresentBox extends Box('keyi') {
unsigned int(8) inlineKeyValueBoxesPresent;
};
```

Semantics inlineKeyValueBoxesPresent may be a Boolean integer that may be set to a non-zero value if inline key/value boxes may be known to be present or might be present in the access units associated with this sample entry.

If MetadataInlineKeysPresentBox may be present but inlineKeyValueBoxesPresent may be set to 0, access units may be treated as though no MetadataInlineKeysPresentBox may be attached to the sample entry. Whether MetadataInlineKeysPresentBox may be absent or inlineKeyValueBoxesPresent may be set to 0, access unit metadata values having a local id that matches the reservation identifier may be ignored.

This approach may allow a sample entry to reserve space for and include a MetadataInlineKeysPresentBox but to rewrite just the inlineKeyValueBoxesPresent field to 0 to signal there may be no inline key/value boxes present.

If all values include inline keys, a MetadataKeyTableBox may still be present although it may be empty (i.e., it contains no MetadataKeyBoxes). It may be also possible to have a combination of some known keys signaled in the MetadataKeyTableBox and some inline key/values signaled with a MetadataInlineKeysPresentBox.

Sample Data Format

An access unit (e.g. a media sample) may be structured as a concatenation of one or more Boxes. Typically each box will contain a metadata value corresponding to a key signaled in the sample entry.

If no value for a particular key may be present in the access unit at the given time, the interpretation may be that there may be no metadata of that type at the time. Metadata values for that key for other times (e.g., from a previous access unit) may not be interpreted as applying to the target time.

If no values for any key may be present for a time range, one approach may be to include a "NULL" access unit (or AU) for the time range. In one embodiment, a zero-byte sized AU may not be used, in one embodiment, as all sample sizes may be one or more bytes in size. Also, an empty track edit list entry could be used to indicate there may be no metadata for a range of movie time.

In one embodiment, however, it may be preferable to include a NULL AU instead of using a track edit with an empty edit to indicate the absence of metadata.

Boxed Metadata AU

A boxed access unit (e.g. a media sample in QuickTime) may be defined as:

```
aligned(8) class MetaDataAccessUnit {
Box boxes[ ];
};
```

It consists of some number of concatenated boxes derived from a type referred to as MetaDataAUBox:

```
aligned(8) class MetaDataAUBox extends Box(local_key_id) {
};
```

Semantics local_key_id corresponds to a local_key_id advertised for a MetadataKeyBox in the MetadataKeyTableBox for the sample entry associated with this AU. No special interpretation may be made regarding the 32-bit value of local_key for values other than 0 and the reservation identifier (for example, 0xFFFFFFFF). Its interpretation may be based solely on what may be advertised in the corresponding MetadataKeyBox of the associated BoxedMetadataSampleEntry.

So, by way of an example, if one were to carry VANC data in an access unit, it might be carried in a derived MetadataAUBox something like this:

```
aligned(8) class VANCMetadataAUBox extends
MetadataAUBox(local_key_id) {
unsigned int(8) vanc_data[...];
}
```

Here, the structure of the value may be specific to how such VANC data may be thought useful to carry. There may be no VANCMetadataAUBox described in this spec; it may be simply an example.

As described before, local_key_id values of 0 may be reserved.

A local_key_id that matches the reservation identifier may indicate that the MetadataAUBox may be instead of a MetadataInlineKeyValueAUBox (described below).

A MetadataAccessUnit may contain boxes with types (the local_key_id) other than those advertised in the MetadataKeyTableBox, the value 0, or the reservation identifier (for example, 0xFFFFFFFF). This however may be discouraged. Any instances of such boxes may be interpreted according to their conventional meaning (e.g., 'free') or in a private way so long as they may be not advertised as keys.

Support for Inline Key/Value Boxes

If the access units associated with the BoxedMetadataSampleEntry contain inline key/value metadata, each inline item may be carried in a box with a local_key_id that matches the reservation identifier and conforming to the type MetadataInlineKeyValueAUBox defined as:

```
aligned(8)    class    MetadataInlineKeyValueAUBox    extends
MetadataAUBox(0xFFFFFFFF) {
MetadataKeyBox inline_key; // local_key_id of '1key'
MetadataAUBox inline_value; // local_key_id of '1val'
}
```

Semantics inline_key may be a MetadataKeyBox where local_key_id may be set to '1key' (for "one key").

inline_value may be a MetadataAUBox where local_key_id may be set to '1val' (for "one value").

The MetadataInlineKeyValueAUBox may be viewed as a MetadataAUBox with two differences:
- It may be a container box carrying two boxes, one a MetadataKeyBox holding the key and the other a MetadataAUBox holding the value for the metadata item.
- It has a local_key_id (or box type) that matches the reservation identifier (for example, 0xFFFFFFFF). All inline key/value boxes share this reservation identifier regardless of the contained value's key.

Because a MetadataInlineKeyValueAUBox carries both the key and the value using that key, this box alone may be sufficient to carry without a MetadataAUBox and an associated BoxedMetadataSampleEntry with a MetadataKeyTableBox having the same local_key_id as the MetadataAUBox. This may allow any non-inline key and associated value to be converted to an inline key/value box. The reverse transform (inline key/value box to non-inline value and sample entry) may be possible, too.

In one embodiment, for example, coded video may be distributed on a "live feed" basis (e.g., real time coding and distribution) and also stored for later distribution on an on demand basis. Reverse transforms may be performed in such applications. During the live feed distribution of coded video, a system 100 (FIG. 1) may employ use of a priori keys 122 and inline keys 124 to coded metadata items as part of coding. Coded video, however, may be subject to a reverse transformation prior to storage, wherein inline keys 124 may be converted to a priori keys 122 for later distribution.

While possible, writing a MetadataInlineKeyValueAUBox declaring a key that's also declared within the MetadataKeyTableBox (i.e., it carries a duplicate MetadataKeyBox) may be strongly discouraged. The presence of a MetadataInlineKeysPresentBox signaling the presence of inline keys defeats optimizations that may be possible when all available keys may be declared within the MetadataKeyTableBox and no inline keys may be used. Using inline keys may be reserved for cases when the keys to be written cannot be known at the time the sample entry may be constructed.

Definition of the Key Search Sample Group

For this section, an optional sample group known as a "key search sample group" may be defined. It consists of SampleGroupDescriptionBox and SampleToGroupBox having the grouping type 'keyp'.

The SampleGroupDescriptionBox may contain variable-sized SampleGroupDescriptionEntries, each of type MetaDataKeySearchGroupEntry. MetaDataKeySearchGroupEntry may be defined in one embodiment as:

```
class MetaDataKeySearchGroupEntry( ) extends
SampleGroupDescriptionEntry('keyp') {
    unsigned int(32) entry_count;
    unsigned int(32) local_key_ids_array[entry_count];
}
```

Semantics entry_count may be a 32-bit unsigned integer holding the number local_key ids that follow in local_key_ids_array[ ].

local_key_ids_array may be an array of 32-bit integers corresponding to the local_key_id field used in the associated MetadataKeyTableBox( ) and the local_key_ids used in associated metadata track access units. A value of 0 may be reserved and may be used to mark an array entry as absent.

A value that matches the reservation identifier (for example, 0xFFFFFFFF) indicates the associated access units all contain one or more inline key/value boxes.

Each sample group description entry signals the presence of one or more keys from the key table found in the sample entry associated with the sample(s). Access units associated with this sample group description shall have corresponding metadata values with these same keys.

Each key in use may be signaled by using the 32-bit integer value of the local_key_id field associated with the MetadataKeyTableBox entry. This local_key_id may be also used in access units as the type of Box holding the corresponding value.

If the access units contain inline key/value boxes, 0xFFFFFFFF may be also recorded in the MetadataKeySearchGroupEntry. There need not be information available about the inline key, simply that inline keys exist.

If two samples differ in the keys present, they cannot share the same sample group description. A sample group description for each combination may be created.

The order of local_key_ids may be the same as the order of local_key_ids in the MetadataKeyTableBox of the sample entry. This may be followed by the reservation identifier (for example, 0xFFFFFFFF) if there may be an inline key present. This prevents group descriptions with the same set of keys but differing only in key order from creating multiple, trivially different sample group descriptions.

There may be no relationship between the order of keys in the MetadataKeySearchGroupEntry and the order of values for those keys in the associated access unit(s).

As the number of local_key_ids present in MetadataKeySearchGroupEntry will typically vary, the containing SampleGroupDescriptionBox may be a version 1 SampleGroupDescriptionBox with a default length set to 0. This indicates there may be a 32-bit size before each group description entry holding the size in bytes of the following entry. A version 0 SampleGroupDescriptionBox may not be used.

Finally, if a sample group spans multiple sample entries with different sets of keys, the local_key_ids present in the sample entries spanned may be compatible (i.e., the local_key_id may be present in each MetadataKeyTableBox and the corresponding key table entry may be the same). An easy way to accomplish this may be not to have samples from different sample entries share the same MetadataKeySearchGroupEntry.

Tracks without inline keys may offer a few advantages:
- A client may determine the entire set of keys that may be present in the track allowing the client to ignore the entire track if no keys of interest to the client may be present.
- Space may be optimized as keys may be carried once in the sample entry and values have only a box header to frame their data and associate them with their key. Inline key/value boxes carry a MetadataKeyBox so if multiple inline keys may be present in the same access units, they do not share the key with sibling boxes or with other access units.
- If the sample group optimization technique described earlier may be used, the client may determine which samples contain values for particular keys.

Tracks signaling the presence of inline keys offer other advantages, however:
- If a new key is involved (e.g., for new key, data type, locale, etc. combination), an inline key/value box may be written at any time. This contrasts to the non-inline key case where the set of keys may be known a priori.

A client may write the track without being able to enumerate all combinations of key properties (key, datatype, locale, etc.).

Thus, the decision whether to incorporate support for inline keys may be tailored to satisfy individual design needs.

A movie may contain a combination of metadata tracks, some using inline keys and some not using inline keys. Where the set of keys may be known a priori, non-inline key bearing tracks may be used. Where it is not possible to define keys a priori, inline keys may be used.

The use of sample group descriptions may allow for rapid search of a run of access units that contain the same set of metadata types. A sample group description, in one embodiment, may be limited to a specific consecutive (in time) set of access units that contain the same set of metadata types, and each of the access units in this set may include an identifier that maps to or points to the corresponding sample group description.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which may be coupled to the media processing system to display titles or other indicators of media being selected through the input device and being presented, either through a speaker or earphone(s), or on the display device, or on both display device and a speaker or earphone(s).

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

For simplicity of exposition, the term 'database' was employed in aspects of the above discussion. It will be readily apparent to one of ordinary skill in the art that in the context of the above discussion the scope of that term is not limited just to for example a database management system but rather encompasses inter alia any data source, data model, etc.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

I claim:

1. An encoding system, comprising:
    a metadata manager interfacing with one or more metadata sources to select metadata item(s) for inclusion in coded multimedia data;
    a key manager to determine, in response to a newly-provided item of metadata from the metadata manager, whether the newly-provided metadata item matches a type of metadata defined in a previously encoded metadata header declaration at an onset of a coding session, and when the newly-provided metadata item does not match the type of metadata defined at the onset of the coding session, representing the newly-provided metadata item as an inline key; and
    an encoder to encode a metadata inline declaration for the newly-provided metadata item in the coded multimedia data, wherein the metadata inline declaration includes the inline key having a first key value that matches a reservation identifier provided in the metadata header declaration at the onset of the coding session and a second key value that is unique to the newly-provided metadata item.

2. The encoding system of claim 1, further including a database to store a list of already-allocated keys.

3. The encoding system of claim 2, wherein the key manager compares the newly-provided metadata item to the list of already-allocated keys to determine whether the newly-provided metadata item can be represented using one of the already-allocated keys or the inline key must be used to represent the newly-provided metadata item.

4. The encoding system of claim 2, wherein if the newly-provided metadata item can be represented by one of the already-allocated keys, the encoder encodes the newly-provided metadata item using a matching one of the already-allocated keys.

5. The encoding system of claim 2, wherein if the newly-provided metadata item cannot be represented by any of the already-allocated keys, the encoder associates the inline key to the reservation identifier and encodes the newly-provided metadata item using the inline key.

6. The encoding system of claim 1, wherein the metadata inline declaration includes specification of a data type of the newly-provided metadata item.

7. The encoding system of claim 1, wherein the encoder further encodes the newly-provided metadata item according to the metadata inline declaration.

8. The encoding system of claim 7, wherein the encoder further encodes multimedia data to produce the encoded multimedia data.

9. The encoding system of claim 1, wherein:
    the metadata header declaration indicates contents of a metadata track of the coded multimedia data, and
    the metadata inline declaration is encoded in the metadata track after the encoding of the metadata header declaration.

10. A decoding system, comprising:
    a decoder to parse data items from coded multimedia data, the data items containing respective key values;
    a key manager to determine, in response to a key value of a newly-provided data item, whether the key value matches a reservation identifier previously decoded from a metadata header declaration,
    if the key value matches the reservation identifier, to compare a supplementary key value provided in the newly-provided data item to a set of previously received inline keys; and
    if the supplementary key value does not match a previously-received inline key, to record the supplementary key value as a new inline key for a new type of metadata item associated with the coded multimedia data.

11. The decoding system of claim 10, further including a database to store a list of already-allocated keys.

12. The decoding system of claim 11, wherein the key manager identifies the newly-provided data item to determine whether the newly-provided data item is represented by one of the already-allocated keys or the newly-provided data item is represented by the new inline key.

13. The decoding system of claim 11, wherein if the newly-provided data item is represented by one of the already-allocated keys, the key manager associates the newly-provided data item with a matching one of the already-allocated keys.

14. The decoding system of claim 11, wherein if the newly-provided data item is represented by the new inline key, the key manager associates the new inline key to the reservation identifier and the metadata item.

15. A method of encoding metadata in an encoding system, comprising:
    at an onset of a coding session:
        assigning unique key values related respectively to items of metadata to be associated with coded multimedia data of the coding session, and
        transmitting to a channel a metadata header declaration comprising the assigned unique key values and data representing types of metadata to which they relate, and a reservation identifier representing an inline key; and during the coding session and after transmitting the metadata header declaration, responsive to a selection of a newly-provided metadata item to be included in the coded multimedia data:
  determining if the newly-provided metadata item matches a type of metadata defined at the onset of a coding session,
  when the newly-provided metadata item does not match the types of metadata defined at the onset of the coding session, assigning an inline key value to the newly-provided metadata item, and
  transmitting to the channel the reservation identifier, the assigned inline key value and a definition of the newly-provided metadata item.

16. The method of claim 15, further including storing a list of already-allocated keys in a database.

17. The method of claim 16, further comprising comparing the newly-provided metadata item to the list of already-allocated keys, determining whether the newly-provided metadata item matches an already-allocated key, and if the newly-provided metadata item matches an already-allocated key,
  transmitting to the channel the reservation identifier, the already-allocated key and data representing values of the newly-provided metadata item.

18. The method of claim 16, further comprising, if the newly-provided metadata item can be represented by one of the already-allocated keys, encoding the newly-provided metadata item using a matching one of the already-allocated keys.

19. The method of claim 16, further comprising, if the newly-provided metadata item cannot be represented by any of the already-allocated keys, associating the inline key to the reservation identifier and encoding the newly-provided metadata item using the inline key.

20. The method of claim 16, further comprising, at a conclusion of the coding session:
  creating a table of a priori key values that includes representations of the assigned inline key values and the unique key values, and
  storing coded video with a metadata file including the table of a priori key values.

21. The encoding system of claim 15, further comprising during the coding session:
  transmitting the newly-provided metadata item according to the definition along with the assigned inline key.

22. A method of decoding metadata in a decoding system, comprising:
  parsing data items from coded multimedia data, the data items containing respective key values;
  determining, in response to a key value of a newly-provided data item, whether the key value matches a reservation identifier in a metadata header declaration provided at an onset of a coding session,
  if the key value matches the reservation identifier in a metadata header declaration provided at the onset of the coding session, comparing a supplementary key value provided in the newly-provided data item to keys previously received in metadata inline declarations; and
  if the supplementary key value does not match a key previously received in metadata inline declarations, recording the supplementary key value as a new inline key for a new type of metadata item associated with the coded multimedia data.

23. The method of claim 22, further storing a list of already-allocated keys in a database.

24. The method of claim 23, further comprising identifying the newly-provided data item to determine whether the newly-provided data item is represented by one of the already-allocated keys or the newly-provided data item is represented by the previously received metadata inline declarations.

25. The method of claim 23, further comprising, if the newly-provided data item is represented by one of the already-allocated keys, associating the newly-provided data item with a matching one of the already-allocated keys.

26. The method of claim 22, further comprising, if the newly-provided data item is represented by a previously received metadata inline declaration, associating the previously received metadata inline declaration to the reservation identifier and the newly-provided data item.

27. A non-transitory computer readable storage medium storing program instructions that, when executed by a processing device, causes the processing device to perform a method comprising:
  parsing data items from coded multimedia data, the data items containing respective key values;
  determining, in response to a key value of a newly-provided data item, whether the key value matches a reservation identifier in a metadata header declaration provided at an onset of a coding session,
  if the key value matches the reservation identifier provided at the onset of the coding session, comparing a supplementary key value provided in the newly-provided data item to a set of previously received inline keys; and
  if the supplementary key value does not match a previously-received inline key, recording the supplementary key value as a new inline key for a new type of metadata associated with the coded multimedia data.

28. A non-transitory computer readable storage medium storing program instructions that, when executed by a processing device, causes the processing device to perform a method comprising: at an onset of a coding session:
  assigning unique key values related respectively to items of metadata to be associated with coded multimedia data of the coding session, and
  transmitting to a channel a metadata header declaration including the assigned unique key values and data representing types of metadata to which they relate, and a reservation identifier representing an inline key;
  during the coding session, responsive to a selection of a newly-provided metadata item to be included in the coded multimedia data:
  determining if the newly-provided metadata item matches a type of metadata defined at the onset of a coding session, when the newly-provided metadata item does not match the type of metadata defined at the onset of the coding session,
  assigning an inline key value to the newly-provided metadata item,
  transmitting to the channel a metadata inline declaration including the reservation identifier, the assigned inline key value and a definition of the newly-provided metadata item.

* * * * *